(12) United States Patent
Bogatsky et al.

(10) Patent No.: US 10,444,030 B1
(45) Date of Patent: Oct. 15, 2019

(54) AUTOMATIC CALIBRATION OF MAGNETIC SENSORS BASED ON OPTICAL IMAGE TRACKING

(71) Applicant: Inertial Labs, Inc., Hamilton, VA (US)

(72) Inventors: Igor Bogatsky, Kiev (UA); Oleg Nesterenko, Kiev (UA); James Marraccini, Hamilton, VA (US); Peter Tewksbury, Hamilton, VA (US)

(73) Assignee: Inertial Labs, Inc., Hamilton, VA (US)

( * ) Notice: Subject to any disclaimer, the term of this patent is extended or adjusted under 35 U.S.C. 154(b) by 1028 days.

(21) Appl. No.: 14/274,917

(22) Filed: May 12, 2014

(51) Int. Cl.
*G01C 25/00* (2006.01)

(52) U.S. Cl.
CPC .................................. *G01C 25/00* (2013.01)

(58) Field of Classification Search
CPC .. H04N 17/002; H04N 5/23216; G01C 17/30; G01C 21/165; G01C 17/138; G01C 21/16; G06F 1/163; G06F 3/013; G01B 5/008; G01S 5/0045; A63F 13/26
USPC .................. 348/187, 180; 702/153; 345/174; 73/1.76; 701/1
See application file for complete search history.

(56) References Cited

U.S. PATENT DOCUMENTS

| | | | | |
|---|---|---|---|---|
| 8,860,818 B1 * | 10/2014 | Sachs | ................ | H04N 5/23216 348/180 |
| 9,163,922 B2 * | 10/2015 | Bridges | ................ | G01B 5/008 |
| 2002/0111717 A1 * | 8/2002 | Scherzinger | ........ | G01C 21/165 701/1 |
| 2011/0141853 A1 * | 6/2011 | Megdal | ................ | G01S 5/0045 367/117 |
| 2011/0307213 A1 * | 12/2011 | Zhao | ..................... | G01C 17/30 702/153 |
| 2012/0096921 A1 * | 4/2012 | Almalki | ................ | G01C 17/38 73/1.76 |
| 2012/0249424 A1 * | 10/2012 | Bove | ...................... | A63F 13/26 345/158 |
| 2014/0104437 A1 * | 4/2014 | Chao | ................... | H04N 17/002 348/187 |

(Continued)

OTHER PUBLICATIONS

"Smartphone hardware sebsors" M. Schirmer and H. Hoepfner accedded: Apr. 27, 2014 https://www.uni-weimar.de/medien/wiki/images/Zeitmaschinen-smartphonesensors.pdf.*

(Continued)

*Primary Examiner* — Regis J Betsch
*Assistant Examiner* — Kaleria Knox
(74) *Attorney, Agent, or Firm* — Bardmesser Law Group

(57) ABSTRACT

The present invention provides the ability to calibrate magnetic sensors for magnetic distortions caused by soft- and hard-iron magnetic interference without a use of any conventional means of magnetic calibration. The system utilizes data collected from an attached camera to track orientation changes during operation that are, then, used to calculate magnetic calibration parameters. The system embodiment allows for calibration to be performed as a background process while the system is in operation. Additionally, the system automatically corrects calibrations in applications where the interference characteristics of the object under measure change. Moreover, the system can be used with unknown absolute heading which may be estimated based on optical data at the same time with magnetometer autocalibration as an extension to the estimation algorithm.

17 Claims, 8 Drawing Sheets

(56) References Cited

U.S. PATENT DOCUMENTS

| | | | | |
|---|---|---|---|---|
| 2014/0160055 A1* | 6/2014 | Margolis | ............... | G06F 1/163 |
| | | | | 345/174 |
| 2015/0097772 A1* | 4/2015 | Starner | ............... | G06F 3/013 |
| | | | | 345/158 |
| 2015/0201867 A1* | 7/2015 | Peindl | ............... | A61B 5/1118 |
| | | | | 600/595 |
| 2017/0010126 A1* | 1/2017 | Han | ............... | G01C 21/16 |

OTHER PUBLICATIONS

"Anroud Meetup@Yech Jini" android sensors, published on Apr. 9, 2013, slides 1-24 https://www.slideshare.net/datta_jini/android-sensors-18449038.*

Sebastian O.H.Madgwick Aotomated calibration of an accelerometers, magnetometers and gyroscopes—A feasibility study , Sep. 20, 2010, pp. 1-11.*

* cited by examiner

AUTOMATIC CALIBRATION OF MAGNETIC SENSORS BASED ON OPTICAL IMAGE TRACKING

BACKGROUND OF THE INVENTION

Field of the Invention

The present invention is directed to calibration of magnetic sensors and, more particularly, to calibration of magnetic sensors for magnetic distortions caused by soft- and hard-iron magnetic interference using optical data acquired from a camera.

Description of the Related Art

Magnetic field sensors (magnetometers) are used widely to provide a means for determining a direction an object is facing relative to the Earth's magnetic north pole. The magnetic field sensors are cost effective and reliable for determining direction or positioning. However, when mounted on objects that contain materials with magnetic properties (like ferromagnetic objects) it is required first to calibrate the magnetometers on the object in order to correct for the magnetic field disturbances caused by it.

Various conventional systems are used for providing means for calibration of magnetometers against the soft- and hard-iron interference of the object under measure. Conventional systems use series of movements that allow the system to collect data during the object movements and then to determine the calibration parameters that are correct for the specific disturbance caused by that object.

An example of a typical method of magnetic calibration is as follows. With the orientation system mounted on the carrier object, the carrier object is rotated in the horizontal plane with periodic stops at approximately each 90 deg (see FIG. 1). At each stopping point the system is, then, pitched up and down more than +/−90 deg (see FIG. 2) and rolled back and forth by +/−180 deg (see FIG. 3).

These movements often become too complex, or in some cases completely impossible, depending on the object to which the device is attached. Therefore, such magnetic sensor technologies are not used in a variety of applications where they could have been used simply because of the inability to effectively and practically calibrate them.

A conventional Attitude and Heading Reference System (AHRS) is depicted in FIG. 4.

The purpose of the magnetometers inside an inertial sensor system is to measure the three Earth magnetic field components in the body axes. Based on these components and vertical orientation data generated by the AHRS, the device's heading can be easily calculated. Magnetometers, accelerometers and gyroscopes 410 produce orientation data. Module 415 applies hard-iron ($H_O$) and soft-iron ($T_m$) magnetometer corrections. Module 420 performs the calculation of corrections to gyro data-based orientation and gyro biases.

The gyro data is integrated in module 430, which uses data produced by the initial alignment algorithm from module 425. Then, Euler angle calculation is performed in module 435 for calculation of object heading, pitch and roll. However, for this system to output correct heading, calibration of its magnetometers against the soft- and hard-iron interference of the object under measure must be previously performed. Moreover, this system does not provide for auto-correction if the soft- and hard-iron interference of the object under measure changes over time for some reason or another. In such case, it is needed to be able to apply correction to magnetic sensors on-the-fly.

Accordingly, there is a need in the art to have an efficient method for auto-calibration of the magnetic sensors.

SUMMARY OF THE INVENTION

The present invention provides the ability to calibrate magnetic sensors for magnetic distortions caused by soft- and hard-iron magnetic interference without a use of any conventional means of magnetic calibration. The system utilizes data collected from an attached camera to track orientation changes during operation that are then used to calculate magnetic calibration parameters that substantially obviates one or several of the disadvantages of the related art.

The conventional methods of calibration require pre-operation procedures to be run in order to complete calibration. An exemplary embodiment allows for calibration to be performed as a background process while the system is in operation. Thus, no specific calibration procedure is needed. Additionally, the system automatically corrects calibrations in applications where the interference characteristics of the object under measure change. Note that conventional systems do not allow magnetic calibration to be a background process. In fact, they do not allow for calibration to be an automated process at all.

When the device is started, an initial orientation is provided from which the optical system collects its initial optical reference. From this initial reference the system, then, tracks orientation changes optically. As more data is collected, the system utilizes these data to calculate the appropriate magnetic calibration parameters. As more data is collected the calibration parameters become more accurate. Note that in conventional systems there is no ability to accurately provide azimuth data until the pre-operation magnetic calibration is completed.

Additionally, the system keeps track of the areas about the 3D of orientation of the object for which calibration data exists and can be used. As additional data is collected in new areas of operation, the effective area in which the unit is magnetically calibrated grows accordingly. To ensure calibration around the full 360 deg of rotation, a user simply must rotate the device under measure through a full 360 deg range of rotation. This provides for both the optical tracking to become more accurate and provides for completion of a full calibration of the magnetometers as well.

When optical orientation data becomes unavailable for whatever reason, the system can switch to magnetic heading with a high level of confidence in its accuracy. Additionally, in situations where the magnetic properties of the device under measure may change due to its application utilization, the system provides real-time adjustments to the magnetic calibration parameters. Note that this differs from the conventional approach in two very significant ways: 1) conventional systems have no means to reliably understand if/when the device under measure has changed its magnetic properties and 2) conventional systems would require the user to stop operation and re-perform the magnetic calibration procedure in order to correct the calibration parameters after such a change. Both of these problems are handled automatically by exemplary embodiment.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE INVENTION

Reference will now be made in detail to the preferred embodiments of the present invention, examples of which are illustrated in the accompanying drawings.

According to the exemplary embodiment, a method and a system for calibration of magnetic sensors for magnetic distortions caused by soft- and hard-iron magnetic interference using data collected from a camera are provided.

Unlike conventional systems for magnetometer calibration that rely on a period of data collection, involving the performance of a sequence of comprehensive 3D movements of the object under measure, prior to system operation, the methods defined by the exemplary embodiment allow for standard operation of the device under measure immediately with calibration occurring as a background process.

The auto-calibration system requires 3D orientation data to be collected during operation either from optics alone or a combination of optics and inertial sensors. This 3D data is split into two parts: orientation related to north (e.g., heading data) and orientation related to the local vertical (e.g., pitch and roll data). When performing the magnetometer auto-calibration, north-related orientation data can be taken only from the optics, while for the vertical orientation one can use either optical data or accelerometer-corrected gyro-based data. The latter is not influenced by magnetic interference. In many cases, such data may be more accurate and reliable than optical data. According to the exemplary embodiment, the optical orientation is used not only to correct gyro data-based orientation, but also to calibrate the magnetometers at the same time so that the magnetometers' data can be used to correct gyro-based orientation later when optical orientation data becomes unavailable.

Figure 1:
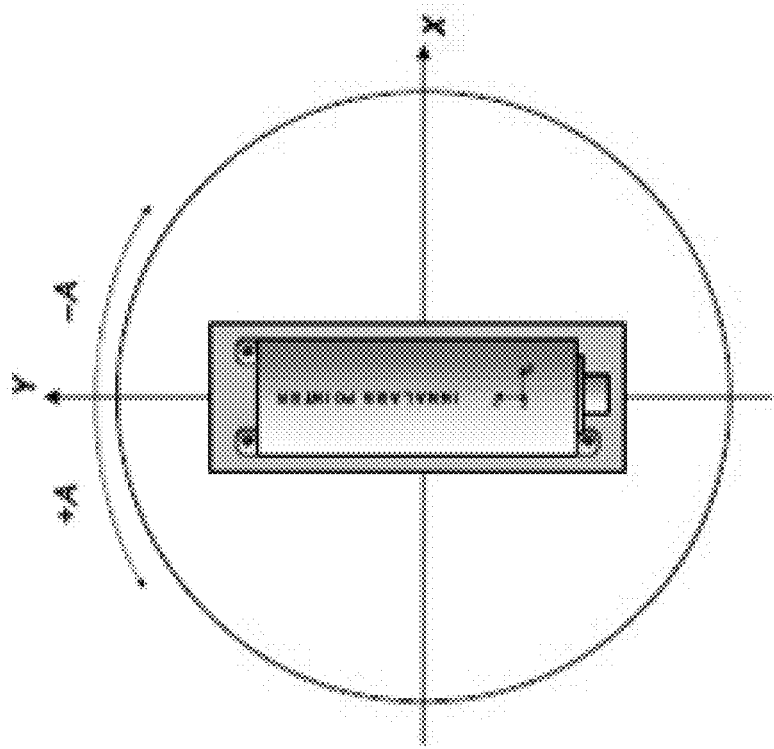
FIG. 1 illustrates a system for performing a conventional orientation procedure.
Figure 2:
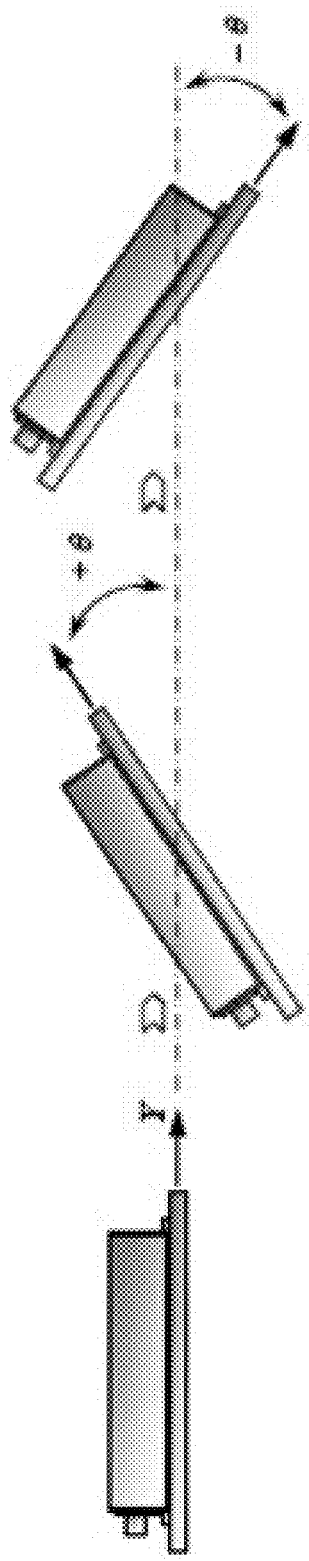
FIG. 2 illustrates a system for performing a conventional orientation procedure.
Figure 3:
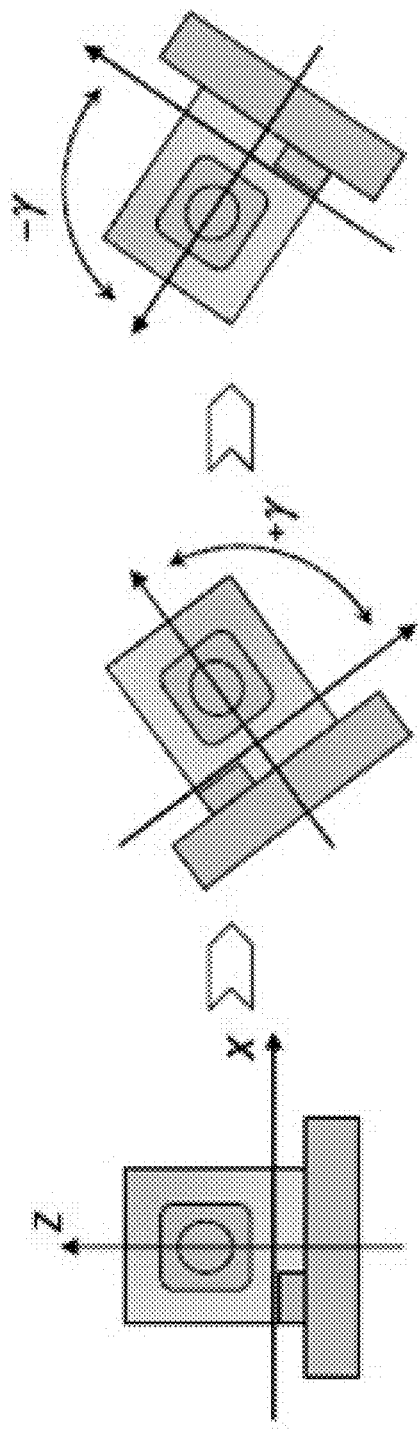
FIG. 3 illustrates a system for performing a conventional orientation procedure.
Figure 4:
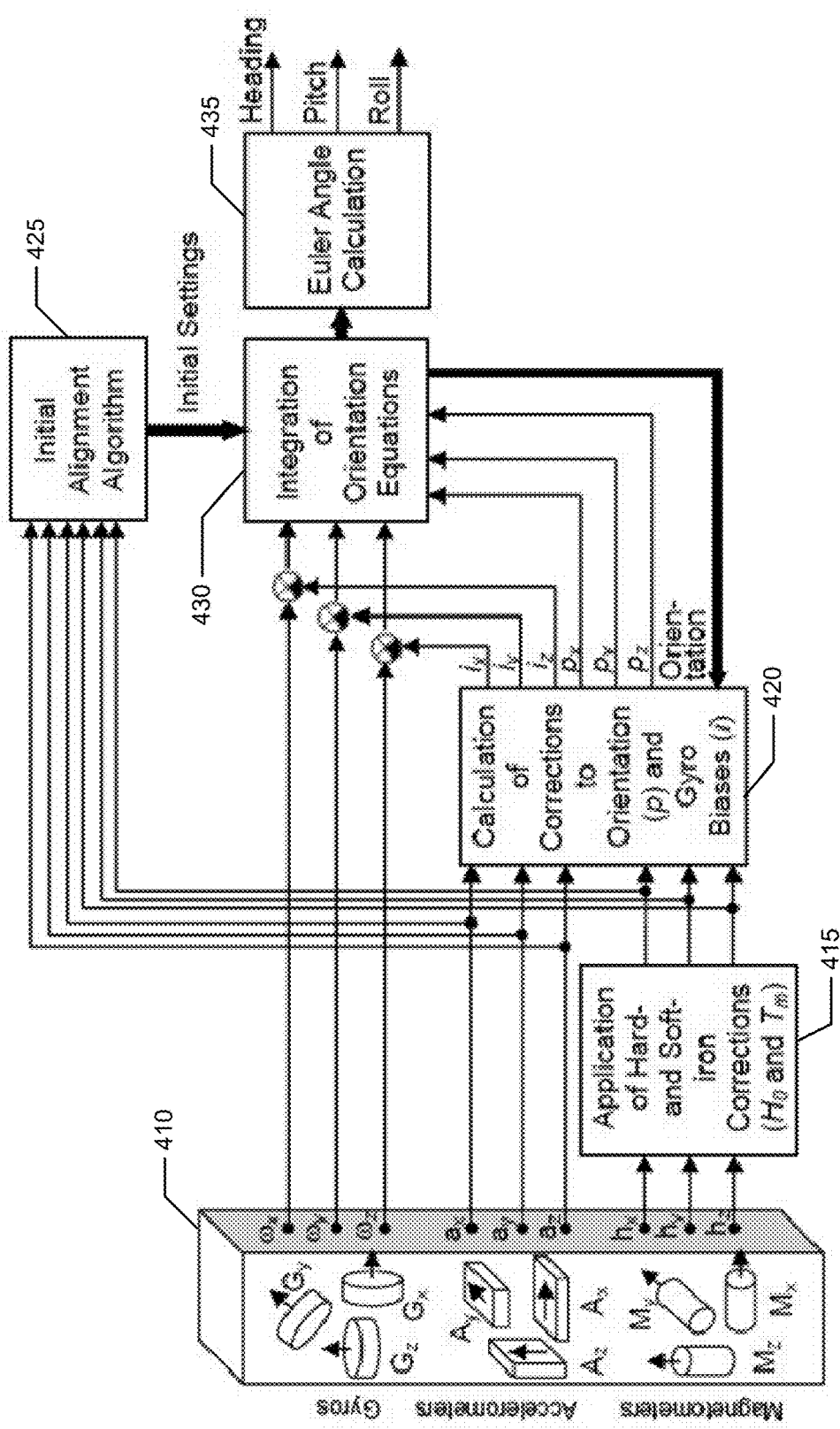
FIG. 4 illustrates a conventional Attitude and Heading Reference System (AHRS)
Figure 5:
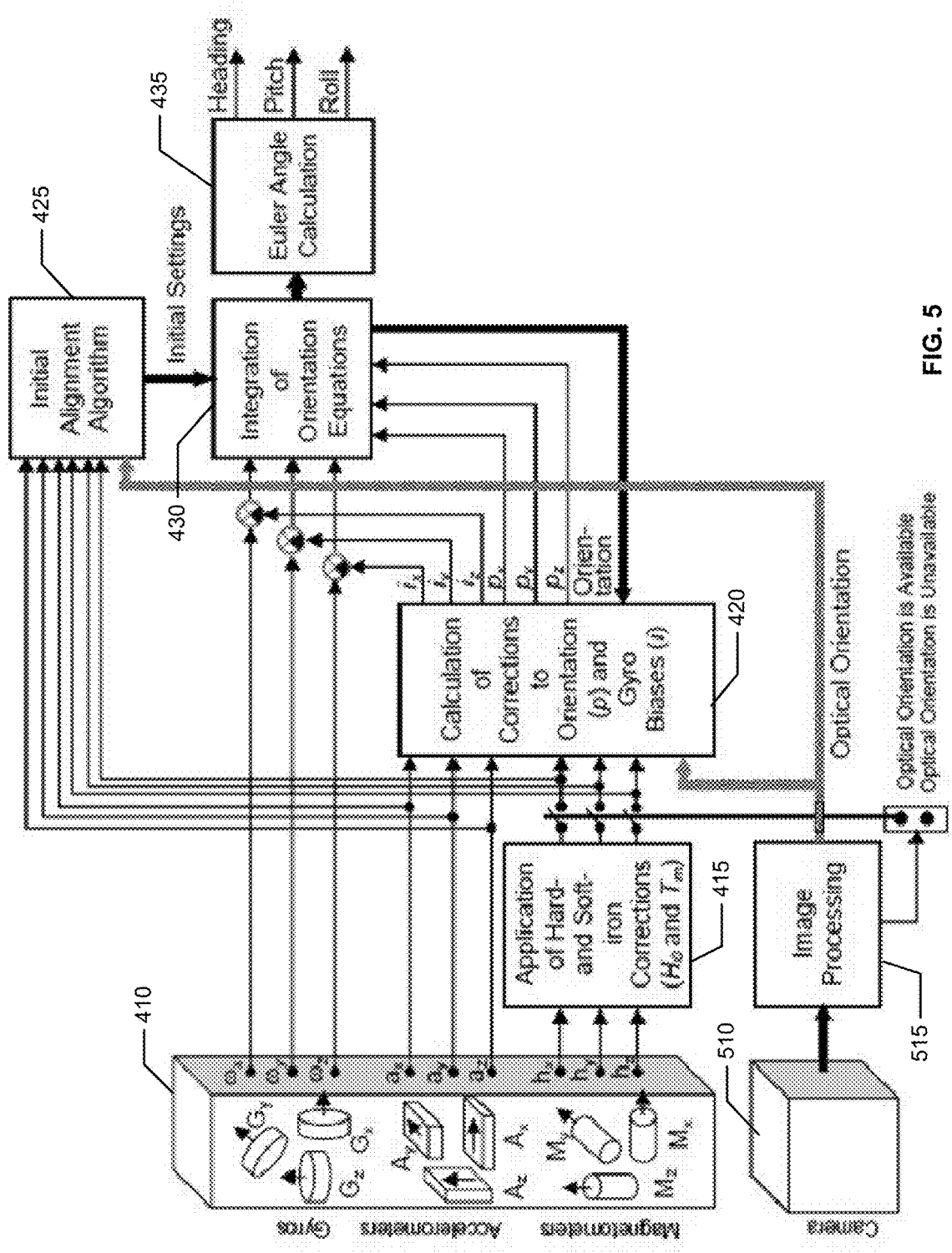
FIG. 5 illustrates an Attitude and Heading Reference System (AHRS) with a video camera providing optical orientation data.

According to the exemplary embodiment, the heading data is always taken from the optics, while the pitch and the roll data can be taken either from the optics or from the inertial system as accelerometer-corrected gyro-based data as shown in FIG. 5. An Attitude and Heading Reference System (AHRS) uses magnetometers inside an inertial sensor system for measuring the three Earth magnetic field components in the body axes.

Based on these components and vertical orientation data generated by the AHRS, a device's heading can be easily calculated. Magnetometers, accelerometers and gyroscopes 410 produce orientation data. In addition to these devices, the exemplary system uses a camera 510 coupled to an image processing unit 515, which provides optical orientation data to module 420 and to module 425. Module 415 applies hard-iron ($H_0$) and soft-iron ($T_m$) magnetometer corrections. Module 420 performs calculation of corrections to gyro data-based orientation and gyro biases based on the available orientation optical data or, if optical data is unavailable, on the magnetometer data. The gyro data is integrated in module 430, which uses data produced by the initial alignment algorithm implemented in module 425. Then, Euler angle calculation is performed in module 435 for calculation of object heading, pitch and roll.

Figure 6:
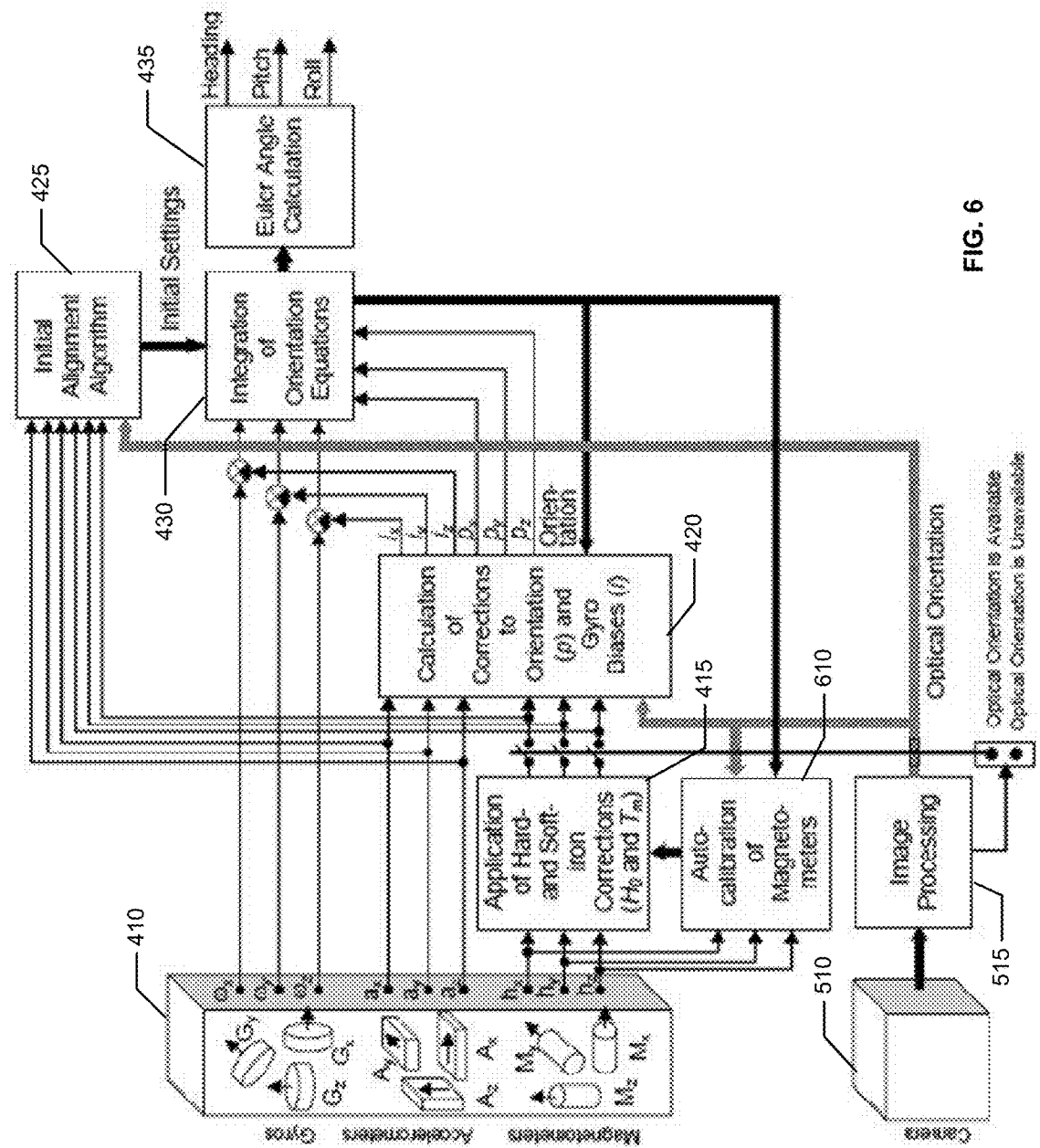
FIG. 6 illustrates an Attitude and Heading Reference System (AHRS) with an auto-calibration module, in accordance with the exemplary embodiment.

FIG. 6 illustrates an exemplary Attitude and Heading Reference System which uses optical data for auto-calibration of magnetometers. According to the exemplary embodiment, magnetometers, accelerometers and gyroscopes 410 and a camera 510 produce orientation data. The exemplary system uses the camera 510 coupled to an image processing unit 515, which provides optical orientation data to module 420 and to module 425. An auto-calibration module 610 receives the optical orientation data and adjusts hard-iron ($H_0$) and soft-iron ($T_m$) magnetometer corrections. The module 415 applies these corrections to the magnetometer data. Module 420 performs calculation of corrections to gyro data-based orientation and gyro biases based on the available optical orientation data or, if optical data is unavailable, on the magnetometer data. The gyro data is integrated in module 430, which uses data produced by the initial alignment algorithm implemented in module 425. Then, Euler angle calculation is performed in module 435 for calculation of object heading, pitch and roll. Note that optical data is audited to ensure its validity. The covariance data from the optical is analyzed prior to being applied to auto calibration.

The purpose of the magnetometers inside an inertial sensor system, such as an Attitude and Heading Reference System (AHRS), is to measure the three Earth magnetic field components in the body axes. Based on these components and vertical orientation data generated by the AHRS, a device's heading can be easily calculated.

In turn, the relation between the Earth magnetic field components and three-axis magnetometer data is as follows:

$$\begin{pmatrix} h_{ex} \\ h_{ey} \\ h_{ez} \end{pmatrix} = T_m \begin{pmatrix} h_x \\ h_y \\ h_z \end{pmatrix} - \begin{pmatrix} h_{0x} \\ h_{0y} \\ h_{0z} \end{pmatrix},$$

where $h_{ex}$, $h_{ey}$, $h_{ez}$ are the Earth magnetic field components in the body axes; $h_x$, $h_y$, $h_z$ are the 3-axis magnetometer data in the body axes; $T_m$ are a 3×3 matrix of the soft-iron magnetometer parameters; $H_0 = (h_{0x}, h_{0y}, h_{0z})^T$ is the hard-iron magnetometer parameter vector.

The hard-iron ($H_0$) and soft-iron ($T_m$) magnetometer parameters are caused by magnetic masses (i.e., the items made from iron) attached to the body. Under ideal conditions (if there are no such masses), the $T_m$ matrix is equal to the unity matrix, while the $H_0$ vector is zero.

The $T_m$ matrix and $H_0$ vector must be known in order to allow the accurate calculation of the Earth magnetic field components in the body axes ($h_{ex}$, $h_{ey}$, $h_{ez}$) based on 3-axis magnetometer data ($h_x$, $h_y$, $h_z$). The purpose of the magnetometer auto-calibration is to estimate these hard- and soft-iron magnetometer parameters to allow the above calculation.

For example, assume that at some time during system operation, the device's heading (H) from the optics is obtained, as well as its pitch (P) and roll (R) from either the optics or the AHRS (accelerometer data or accelerometer-corrected gyro-based data). Based on this data and knowing the position on the Earth, the Earth magnetic field components in the body axes ($h_{ex}$, $h_{ey}$, $h_{ez}$) at this time can be calculated as:

$$\begin{pmatrix} h_{ex} \\ h_{ey} \\ h_{ez} \end{pmatrix} =$$

$$\begin{pmatrix} cosHcosR + sinHsinRsinP & -sinHcosR + cosHsinRsinP & -cosPsinR \\ sinHcosP & cosHcosP & sinP \\ cosHsinR - sinHcosRsinP & -sinHsinR - cosHcosRsinP & cosPcosR \end{pmatrix} \begin{pmatrix} h_{xg} \\ h_{yg} \\ h_{zg} \end{pmatrix},$$

where $h_{xg}$, $h_{yg}$, $h_{zg}$ are the Earth magnetic field components in the reference axes (east, north, upward).

Having the values of the Earth magnetic field components in the body axes ($h_{ex}$, $h_{ey}$, $h_{ez}$) calculated as shown above at different times together with magnetometer data ($h_x$, $h_y$, $h_z$) at the same times, we can estimate the hard-iron ($H_0$) and soft-iron ($T_m$) magnetometer parameters. There are several ways to do so. Two of them are provided below.

The hard-iron ($H_0$) and soft-iron ($T_m$) magnetometer parameters can be estimated by batch processing. Let's assume that, from the start of system operation, we have received the data required to calculate the $h_{exi}$, $h_{eyi}$, $h_{ezi}$ components (as shown above) N times (i=1, ..., N). Having 3-axis magnetometer data ($h_{xi}$, $h_{yi}$, $h_{zi}$) at the same times, we can apply the least-square fit to estimate the hard-iron ($H_0$) and soft-iron ($T_m$) magnetometer parameters:

$$\begin{pmatrix} \hat{t}_{11} & \hat{t}_{12} & \hat{t}_{13} & \hat{h}_{0x} \\ \hat{t}_{21} & \hat{t}_{22} & \hat{t}_{23} & \hat{h}_{0y} \\ \hat{t}_{31} & \hat{t}_{32} & \hat{t}_{33} & \hat{h}_{0z} \end{pmatrix} = \begin{pmatrix} h_{ex1} & h_{ex2} & \ldots & h_{exN} \\ h_{ey1} & h_{ey2} & \ldots & h_{eyN} \\ h_{ez1} & h_{ez2} & \ldots & h_{ezN} \end{pmatrix} D_m^T (D_m D_m^T)^{-1},$$

where $t_{11}$, $t_{12}$, $t_{13}$, $t_{21}$, $t_{22}$, $t_{23}$, $t_{31}$, $t_{32}$, $t_{33}$ are the corresponding components of the $T_m$ matrix;

$$D_m = \begin{pmatrix} h_{x1} & h_{x2} & \ldots & h_{xN} \\ h_{y1} & h_{y2} & \ldots & h_{yN} \\ h_{z1} & h_{z2} & \ldots & h_{zN} \\ -1 & -1 & \ldots & -1 \end{pmatrix}.$$

It should be noted that the batch processing approach has the following drawbacks:

1) The hard-iron ($H_0$) and soft-iron ($T_m$) parameters cannot be applied to correct magnetometer output data at the times preceding the moment when they may be estimated for the first time (i.e. when N becomes ≥4), and their subsequent estimation at each data sampling step requires considerable computer load.

2) In the case of long-time device operation, the approach requires a considerable memory space to store all the data.

3) Depending on device's motion before time N, some of the parameters can be unobservable which makes the whole system singular, which, in its turn, makes it impossible to estimate the rest of the parameters.

Figure 7:
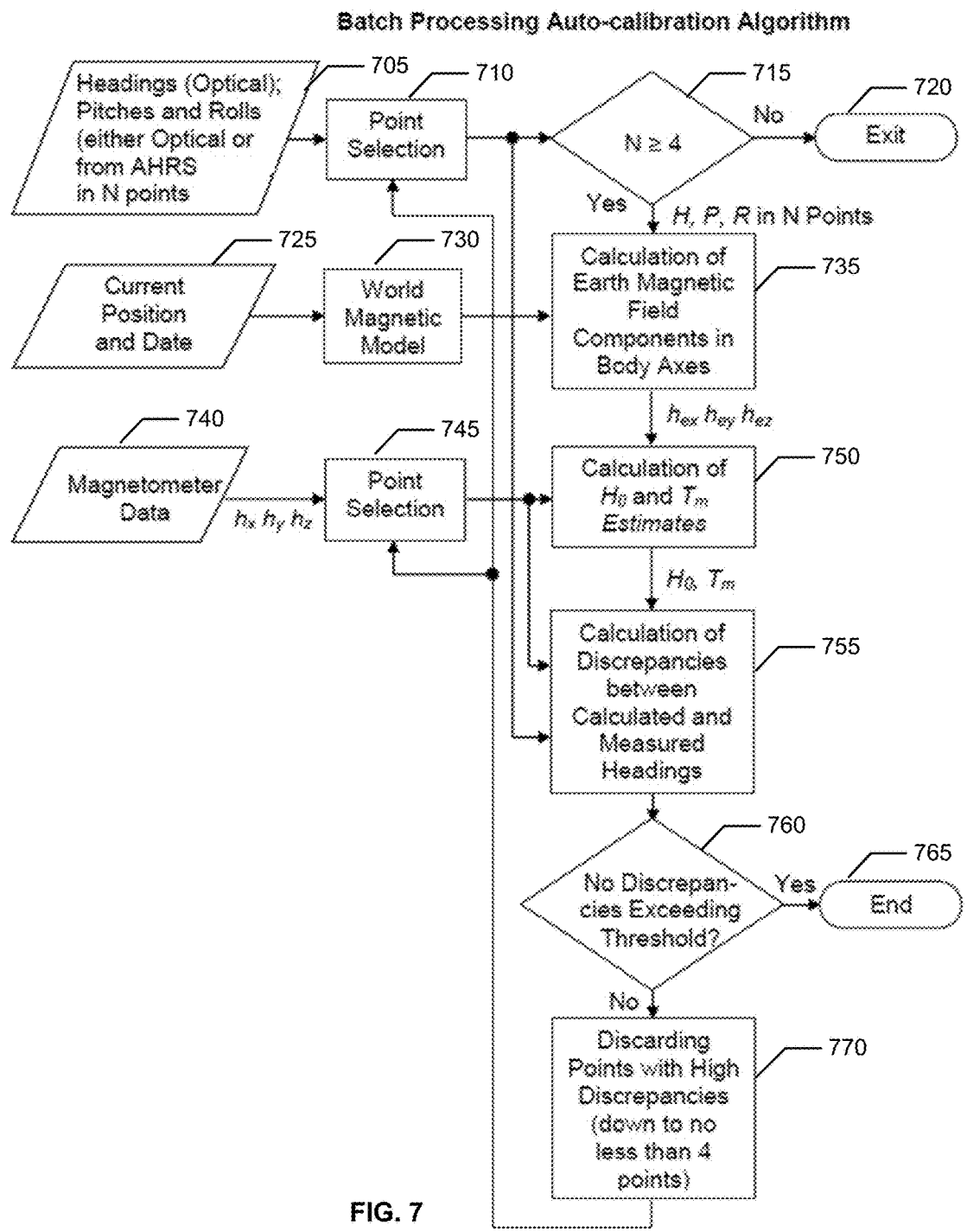
FIG. 7 illustrates a flowchart of a batch processing auto-calibration algorithm, in accordance with the exemplary embodiment.

A flow chart of batch processing is depicted in FIG. 7. In step 705, heading, pith and roll data in N points is acquired. In step 710, the point selection is made. If N is more or equal to 4 (there are three equations for every point and twelve unknown parameters—thus N=12/3=4) in step 715, the Earth magnetic field components are calculated in body axes using current position and date from step 725 and word magnetic model from step 730 If, in step 715, N is less than 4, the calibration process is terminated in step 720.

In step 750, hard-iron ($H_0$) and soft-iron ($T_m$) magnetometer parameters are estimated using magnetometer data from step 740 and point selection from step 745. In step 755, the discrepancies between calculated and measured headings are calculated. If, in step 760, discrepancies exceeding threshold are detected, the points with high discrepancies are discarded down to 4 points in step 770. Then, the points are selected in steps 710 and 745. Otherwise the calibration process is terminated in step 765.

According to the exemplary embodiment, the hard-iron ($H_0$) and soft-iron ($T_m$) magnetometer parameters can be estimated by sequential processing. The recursive least-square approach allows obtaining the same result while avoiding the drawbacks of the batch processing method. The key idea of the approach is not to process all the collected data at the same time, but to process the measurements one after another. Each measurement is processed when it becomes available, improving the parameter estimates with each incoming measurement.

A shortcoming of the least-square fit approach (both the batch and sequential one) is that it considers the estimated parameters constant over all the time of device's operation and does not take into account changes in them that may take place in them from time to time for one reason or another. Due to a large number of measurements that have been obtained before a change and an equal weight of each measurement, the measurements obtained upon the change cannot overcome the large number of measurements obtained before the change, and because of this, the parameter estimates become inaccurate. To avoid this, the recursive least-square approach is extended to the Kalman filter that allows application of higher weights to later measurements.

The magnetometer auto-calibration algorithm implements the Kalman filter and is built according to the close-loop approach making it possible to improve the estimated parameter values upon processing each measurement:

$$\begin{pmatrix} \hat{t}_{11i} \\ \hat{t}_{12i} \\ \hat{t}_{13i} \\ \hat{h}_{0xi} \end{pmatrix} = \begin{pmatrix} \hat{t}_{11(i-1)} \\ \hat{t}_{12(i-1)} \\ \hat{t}_{13(i-1)} \\ \hat{h}_{0x(i-1)} \end{pmatrix} - K_{mxi} y_{mxi};$$

$$\begin{pmatrix} \hat{t}_{21i} \\ \hat{t}_{22i} \\ \hat{t}_{23i} \\ \hat{h}_{0yi} \end{pmatrix} = \begin{pmatrix} \hat{t}_{21(i-1)} \\ \hat{t}_{22(i-1)} \\ \hat{t}_{23(i-1)} \\ \hat{h}_{0y(i-1)} \end{pmatrix} - K_{myi} y_{myi};$$

$$\begin{pmatrix} \hat{t}_{31i} \\ \hat{t}_{32i} \\ \hat{t}_{33i} \\ \hat{h}_{0zi} \end{pmatrix} = \begin{pmatrix} \hat{t}_{31(i-1)} \\ \hat{t}_{32(i-1)} \\ \hat{t}_{33(i-1)} \\ \hat{h}_{0z(i-1)} \end{pmatrix} - K_{mzi} y_{mzi},$$

where $y_{mxi}$, $y_{myi}$, $y_{mzi}$ are the three measurements at time i:

$$\begin{pmatrix} y_{mxi} \\ y_{myi} \\ y_{mzi} \end{pmatrix} = \hat{T}_{m(i-1)} \begin{pmatrix} h_{xi} \\ h_{yi} \\ h_{zi} \end{pmatrix} - \begin{pmatrix} \hat{h}_{0x(i-1)} \\ \hat{h}_{0y(i-1)} \\ \hat{h}_{0z(i-1)} \end{pmatrix} - \begin{pmatrix} h_{exi} \\ h_{eyi} \\ h_{ezi} \end{pmatrix};$$

$K_{mxi}$, $K_{myi}$, $K_{mzi}$ is 4×1 matrices of the Kalman filter gains:

$$K_{mpi} = P_{mp(i/i-1)} H_{mi}^T (H_{mi} P_{mp(i/i-1)} H_{mi}^T + r_{mp})^{-1},$$

$$P_{mpi} = (I - K_{mpi} H_{mi}) P_{mp(i/i-1)};$$

$$P_{mp(i/i-1)} = P_{mp(i-1)} + Q_{mp} (p=x,y,z),$$

where $H_{mi} = (h_{xi}\ h_{yi}\ h_{zi}\ -1)$ is the observation matrix; $P_{mpi}$ and $P_{mi(i-1)}$ are the 4×4 updated estimate covariance matrices at times i and (i-1), correspondingly; $P_{mp(i/i-1)}$ are the 4×4 predicted estimate covariance matrices at time i; $r_{mp}$ are the measurement noise covariance values; $Q_{mp}$ are the 4×4 process noise covariance matrices.

Note that in the proposed auto-calibration algorithm implementation, the $Q_{mp}$ process noise covariance matrices have all its components equal to zero, except the diagonal ones. The higher the latter are, the later measurements prevail over earlier measurements (to take into account some changes that may appear in the values of the estimated parameters during device's operation for one reason or another). If all the $Q_{mp}$ matrix components (including the diagonal ones) are set equal to zero, the Kalman filter (in this implementation) downgrades to the recursive least-square fit (see above).

Figure 8:
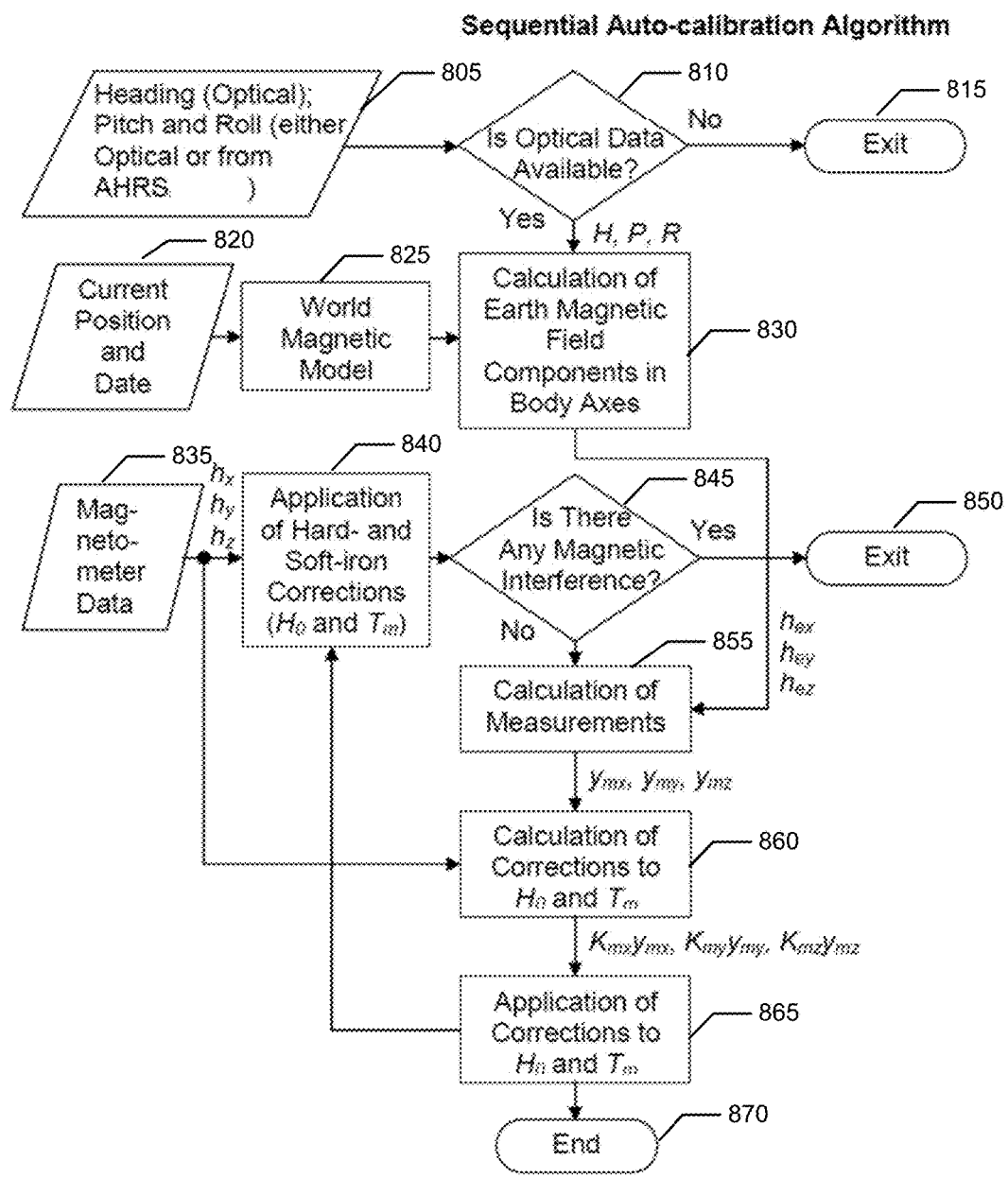
FIG. 8 illustrates a flowchart of a sequential auto-calibration algorithm, in accordance with the exemplary embodiment.

A flow chart of the sequential processing is depicted in FIG. 8. In step 805, heading, pith and roll data is acquired. If the optical data available in step 810, the Earth magnetic field components are calculated in body axes using current position and date from step 820 and word magnetic model from step 825. If the optical data is not available in step 810, the process is terminated in step 815.

Magnetometer data is acquired in step 835. The hard-iron ($H_0$) and soft-iron ($T_m$) magnetometer corrections are applied in step 840. If the magnetic interference is detected in step 845, the process is terminated in step 850. Otherwise, the measurements are calculated in step 855 using parameters from step 830 and magnetometer data from step 835. The process applies the corrections of $H_0$ and $T_m$ in step 865 and ends in step 870.

According to one exemplary embodiment, the system can be used with unknown absolute heading. It may be the case that the optical part of the device outputs not device's absolute heading related to the true or magnetic north, but heading related to some initial direction of which the absolute heading is unknown (i.e. the direction of the optical data zero reference point). In this case, the problem of estimating this optical data zero reference point heading arises. This problem may be also solved based on optical data at the same time with magnetometer auto-calibration as an extension of the above algorithms.

Assume that the optical system outputs device's heading (H') related to some direction with an unknown heading $H_f$. Thus, device's absolute heading may be calculated according to the expression: $H = H_f + H'$. To make it possible, we need to estimate $H_f$.

Like in the case of other similar problems, to avoid nonlinearities created by the use of trigonometric functions (sine and cosine of $H_f$), the problem shall be solved in two stages: fine and coarse heading estimation.

The coarse heading estimation is implemented as follows. The purpose of this stage is to reduce the error of $H_f$ to a level (to about less than ±5 degrees) when the trigonometric functions of the $H_f$ error can be replaced by the first components of their linearization to make the whole estimation system linear at the fine heading estimation stage.

The extended Kalman filter version given below is also built according to the close-loop approach making it possible to improve the estimated parameter values upon processing each measurement:

$$\begin{pmatrix} \hat{t}_{11i} \\ \hat{t}_{12i} \\ \hat{t}_{13i} \\ \hat{t}_{21i} \\ \hat{t}_{22i} \\ \hat{t}_{23i} \\ \hat{t}_{31i} \\ \hat{t}_{32i} \\ \hat{t}_{33i} \\ \hat{h}_{0xi} \\ \hat{h}_{0yi} \\ \hat{h}_{0zi} \\ \hat{c}_{Hfi} \\ \hat{s}_{Hfi} \end{pmatrix} = \begin{pmatrix} \hat{t}_{11(i-1)} \\ \hat{t}_{12(i-1)} \\ \hat{t}_{13(i-1)} \\ \hat{t}_{21(i-1)} \\ \hat{t}_{22(i-1)} \\ \hat{t}_{23(i-1)} \\ \hat{t}_{31(i-1)} \\ \hat{t}_{32(i-1)} \\ \hat{t}_{33(i-1)} \\ \hat{h}_{0x(i-1)} \\ \hat{h}_{0y(i-1)} \\ \hat{h}_{0z(i-1)} \\ \hat{c}_{Hf(i-1)} \\ \hat{s}_{Hf(i-1)} \end{pmatrix} - K_{mi} y_{mi},$$

where $y_m$ is the 3×1 measurement vector at time i:

$$y_{mi} = \hat{T}_{m(i-1)} \begin{pmatrix} h_{xi} \\ h_{yi} \\ h_{zi} \end{pmatrix} - \begin{pmatrix} \hat{h}_{0x(i-1)} \\ \hat{h}_{0y(i-1)} \\ \hat{h}_{0z(i-1)} \end{pmatrix} - \begin{pmatrix} c_{31i} h_{zg} \\ c_{32i} h_{zg} \\ c_{33i} h_{zg} \end{pmatrix};$$

$K_m$ is a 14×3 matrix of the Kalman filter gains:

$K_{mi} = P_{m(i/i-1)} H_{mi}^T (H_{mi} P_{m(i/i-1)} H_{mi}^T + R_m)^{-1};$ $P_{mi} = (I - K_{mi} H_{mi}) P_{m(i/i-1)};$ $P_{m(i/i-1)} = P_{m(i-1)} + Q_m,$ where $H_{mi}$ is the 3×14 observation matrix:

$$H_{mi} = \begin{pmatrix} h_{xi} & h_{yi} & h_{zi} & 0 & 0 & 0 & 0 & 0 & 0 & -1 & 0 & 0 & c_{11i}h_{xg} + c_{21i}h_{yg} & c_{21i}h_{xg} - c_{11i}h_{yg} \\ 0 & 0 & 0 & h_{xi} & h_{yi} & h_{zi} & 0 & 0 & 0 & 0 & -1 & 0 & c_{12i}h_{xg} + c_{22i}h_{yg} & c_{22i}h_{xg} - c_{12i}h_{yg} \\ 0 & 0 & 0 & 0 & 0 & 0 & h_{xi} & h_{yi} & h_{zi} & 0 & 0 & -1 & c_{13i}h_{xg} + c_{23i}h_{yg} & c_{23i}h_{xg} - c_{13i}h_{yg} \end{pmatrix}$$

$P_{mi}$ and $P_{m(i-1)}$ are the 14×14 updated estimate covariance matrices at times i and (i−1), correspondingly; $P_{m(i-1)}$ is the 14×14 predicted estimate covariance matrix at time i; $R_m$ is the 3×3 measurement noise covariance matrix; $Q_m$ is the 14×14 process noise covariance matrix;

$c_{11i} = \cos H_i' \cos R_i + \sin H_i' \sin R_i \sin P_i$; $c_{21i} = -\sin H_i' \cos R_i + \cos H_i' \sin R_i \sin P_i$; $c_{31i} = -\cos P_i \sin R_i$;

$c_{12i} = \sin H_i' \cos P_i$; $c_{22i} = \cos H_i' \cos P_i$; $c_{32i} = \sin P_i$;

$c_{13i} = \cos H_i' \sin R_i - \sin H_i' \cos R_i \sin P_i$; $c_{23i} = -\sin H_i' \sin R_i - \cos H_i' \cos R_i \sin P_i$; $c_{33i} = \cos P_i \cos R_i$, where $H_i'$, $P_i$, $R_i$ are device's heading, pitch, and roll obtained at time i.

When, upon some device's rotation, the diagonal components of the $P_{mi}$ matrix associated with $c_{Hf}$ and $s_{Hf}$ decrease down to $8 \cdot 10^{-3}$ rad$^2$, a preliminary estimation of $H_f$ may be performed:

(i) If $\hat{s}_{Hfi} \geq 0$ and $\hat{c}_{Hfi} > 0$, then if $|\hat{s}_{Hfi}| \leq |\hat{c}_{Hfi}|$, then $\hat{H}_f = \arctan(\hat{s}_{Hfi}/\hat{c}_{Hfi})$, while if $|\hat{s}_{Hfi}| > |\hat{c}_{Hfi}|$, then $\hat{H}_f = \pi/2 - \arctan(\hat{c}_{Hfi}/\hat{s}_{Hfi})$;

(ii) If $\hat{s}_{Hfi} > 0$ and $\hat{c}_{Hfi} \leq 0$, then if $|\hat{s}_{Hfi}| \leq |\hat{c}_{Hfi}|$, then $\hat{H}_f = \pi + \arctan(\hat{s}_{Hfi}/\hat{c}_{Hfi})$, while if $|\hat{s}_{Hfi}| > |\hat{c}_{Hfi}|$, then $\hat{H}_f = \pi/2 - \arctan(\hat{c}_{Hfi}/\hat{s}_{Hfi})$;

(iii) If $\hat{s}_{Hfi} \leq 0$ and $\hat{c}_{Hfi} < 0$, then if $|\hat{s}_{Hfi}| \leq |\hat{c}_{Hfi}|$, then $\hat{H}_f = \pi + \arctan(\hat{s}_{Hfi}/\hat{c}_{Hfi})$, while if $|\hat{s}_{Hfi}| > |\hat{c}_{Hfi}|$, then $\hat{H}_f = 3\pi/2 - \arctan(\hat{c}_{Hfi}/\hat{s}_{Hfi})$;

(iv) If $\hat{s}_{Hfi} < 0$ and $\hat{c}_{Hfi} \geq 0$, then if $|\hat{s}_{Hfi}| \leq |\hat{c}_{Hfi}|$, then $\hat{H}_f = 2\pi + \arctan(\hat{s}_{Hfi}/\hat{c}_{Hfi})$, while if $|\hat{s}_{Hfi}| > |\hat{c}_{Hfi}|$, then $\hat{H}_f = 3\pi/2 - \arctan(\hat{c}_{Hfi}/\hat{s}_{Hfi})$.

Upon the completion of the coarse heading estimation, the fine heading estimation may be implemented as follows:

$$\begin{pmatrix} \hat{t}_{11i} \\ \hat{t}_{12i} \\ \hat{t}_{13i} \\ \hat{t}_{21i} \\ \hat{t}_{22i} \\ \hat{t}_{23i} \\ \hat{t}_{31i} \\ \hat{t}_{32i} \\ \hat{t}_{33i} \\ \hat{h}_{0xi} \\ \hat{h}_{0yi} \\ \hat{h}_{0zi} \\ \hat{H}_{fi} \end{pmatrix} = \begin{pmatrix} \hat{t}_{11(i-1)} \\ \hat{t}_{12(i-1)} \\ \hat{t}_{13(i-1)} \\ \hat{t}_{21(i-1)} \\ \hat{t}_{22(i-1)} \\ \hat{t}_{23(i-1)} \\ \hat{t}_{31(i-1)} \\ \hat{t}_{32(i-1)} \\ \hat{t}_{33(i-1)} \\ \hat{h}_{0x(i-1)} \\ \hat{h}_{0y(i-1)} \\ \hat{h}_{0z(i-1)} \\ \hat{H}_{f(i-1)} \end{pmatrix} - K_{mi} y_{mi},$$

where $y_m$ is the 3×1 measurement vector at time i:

$$y_{mi} = \hat{T}_{m(i-1)} \begin{pmatrix} h_{xi} \\ h_{yi} \\ h_{zi} \end{pmatrix} - \begin{pmatrix} \hat{h}_{0x(i-1)} \\ \hat{h}_{0y(i-1)} \\ \hat{h}_{0z(i-1)} \end{pmatrix} - \begin{pmatrix} h_{exi} \\ h_{eyi} \\ h_{ezi} \end{pmatrix};$$

$K_m$ is a 13×3 matrix of the Kalman filter gains:

$$K_{mi} = P_{m(i/i-1)} H_{mi}^T (H_{mi} P_{m(i/i-1)} H_{mi}^T + R_m)^{-1};$$

$$P_{mi} = (I - K_{mi} H_{mi}) P_{m(i/i-1)};$$

$$P_{m(i/i-1)} = P_{m(i-1)} + Q_m,$$

where $H_{mi}$ is the 3×13 observation matrix:

$$H_{mi} = \begin{pmatrix} h_{xi} & h_{yi} & h_{zi} & 0 & 0 & 0 & 0 & 0 & 0 & -1 & 0 & 0 & \begin{matrix} c_{21i} h_{xg} - \\ c_{11i} h_{yg} \end{matrix} \\ 0 & 0 & 0 & h_{xi} & h_{yi} & h_{zi} & 0 & 0 & 0 & 0 & -1 & 0 & \begin{matrix} c_{22i} h_{xg} - \\ c_{12i} h_{yg} \end{matrix} \\ 0 & 0 & 0 & 0 & 0 & 0 & h_{xi} & h_{yi} & h_{zi} & 0 & 0 & -1 & \begin{matrix} c_{23i} h_{xg} - \\ c_{13i} h_{yg} \end{matrix} \end{pmatrix}$$

$P_{mi}$ and $P_{m(i-1)}$ are the 13×13 updated estimate covariance matrices at times i and (i−1), correspondingly; $P_{m(i/i-1)}$ is the 13×13 predicted estimate covariance matrix at time i; $R_m$ is the 3×3 measurement noise covariance matrix; $Q_m$ is the 13×13 process noise covariance matrix;

$$\begin{pmatrix} h_{exi} \\ h_{eyi} \\ h_{ezi} \end{pmatrix} = \begin{pmatrix} \cos H_i \cos R_i + \sin H_i \sin R_i \sin P_i & -\sin H_i \cos R_i + \cos H \sin R_i \sin P_i & -\cos P_i \sin R_i \\ \sin H_i \cos P_i & \cos H_i \cos P_i & \sin P_i \\ \cos H_i \sin R_i - \sin H_i \cos R_i \sin P_i & -\sin H_i \sin R_i - \cos H \cos R_1 \sin P_i & \cos P_i \cos R_i \end{pmatrix} \begin{pmatrix} h_{xg} \\ h_{yg} \\ h_{zg} \end{pmatrix},$$

where $H_i = \hat{H}_{f(i-1)} + H_i'$.

Having thus described a preferred embodiment, it should be apparent to those skilled in the art that certain advantages of the described method and apparatus have been achieved. In particular, those skilled in the art would appreciate that the proposed system and method provide for efficient on-the-fly auto-calibration of magnetic sensors as the environment conditions change.

It should also be appreciated that various modifications, adaptations and alternative embodiments thereof may be made within the scope and spirit of the present invention. The invention is further defined by the following claims.

What is claimed is:

1. An Attitude and Heading Reference System (AHRS) for determining orientation, the system comprising:
   a plurality of gyroscopes outputting orientation data of an object;
   a plurality of accelerometers and at least one magnetometer attached to the object,
   wherein the accelerometers and the at least one magnetometer are used to correct the orientation data;
   a camera attached to the object;
   an image processing unit coupled to the camera, the image processing unit configured to provide an optical orientation data; and
   an auto-calibration module connected to the magnetometer and configured to continuously calibrate the magnetometer in the background using a least squares method with a closed-loop Kalman filter,
   wherein:
      the image processing unit provides optical orientation data to the auto-calibration module;
      the auto-calibration module receives the optical orientation data from the image processing unit and calibrates the magnetometer based on the optical orientation data; and
      the auto-calibration module provides data to a module for application of the calibrated magnetometer parameters to magnetometer data.

2. The system of claim 1, further comprising estimating, together with calibrating the magnetometer, the direction of the optical data zero reference point.

3. The system of claim 1, further comprising performing the calibration and estimation using a batch processing.

4. The system of claim 1, further comprising performing the calibration and estimation using a sequential processing.

5. The system of claim 1, further comprising calculating adjustments to the magnetometer parameters based on newly acquired optical orientation and magnetometer data, if the magnetometer parameters change over time.

6. The system of claim 1, further comprising performing the calibration and estimation using optical orientation data for heading and accelerometer data for vertical orientation.

7. The system of claim 1, further comprising performing the calibration and estimation using the optical orientation for heading and accelerometer-corrected gyro-based data for vertical orientation.

8. A method for calibration of an Attitude and Heading Reference System (AHRS) magnetic sensors using optical orientation data for an object, the method comprising:
   acquiring orientation data of the object from a plurality of gyroscopes attached to the object;
   acquiring acceleration data from a plurality of accelerometers attached to the object;
   acquiring optical orientation data for several orientations of the object, using a camera attached to the object;
   calculating Earth magnetic field components for the several orientations, in a body reference frame of a magnetometer, the body reference frame defined by three orthogonal body axes that rotate and move with the magnetometer, as if attached, the calculating based on the optical orientation data;
   acquiring magnetometer data for the several orientations;
   correcting the orientation data with the accelerometer data and the magnetometer data;
   continuously estimating magnetometer parameters in the background using a least-squares method with a closed-loop Kalman filter and based on the optical orientation data; and
   continuously calibrating the magnetometer in the background with the estimated magnetometer parameters.

9. The method of claim 8, further comprising estimating, together with the magnetometer parameters, the direction of an optical data zero reference point.

10. The method of claim 8, further comprising performing the estimation using a batch processing.

11. The method of claim 8, further comprising performing the estimation using a sequential processing.

12. The method of claim 8, further comprising calculating adjustments to the magnetometer parameters based on newly acquired optical orientation and magnetometer data, if the magnetometer parameters change over time.

13. The method of claim 8, further comprising performing the estimation using optical orientation data for heading and accelerometer data for vertical orientation.

14. The method of claim 8, further comprising performing the estimation using optical orientation data for heading and accelerometer-corrected gyro-based data for vertical orientation.

15. The method of claim 8, wherein the magnetometer parameters include hard and soft iron estimates.

16. The method of claim 8, further comprising:
receiving a current position of the object; and
calculating Earth magnetic field components in the body axes based on the current position and world magnetic model.

17. The method of claim 8, further comprising:
calculating discrepancies between calculated and measured headings using the accelerometer data and the magnetometer data; and
discarding any optical orientation data with high discrepancy.

\* \* \* \* \*